United States Patent [19]

Nemec et al.

[11] Patent Number: 4,782,511

[45] Date of Patent: Nov. 1, 1988

[54] INTERACTIVE MEDICAL LABORATORY SPECIMEN APPARATUS SYSTEM

[75] Inventors: Edward M. Nemec; Miles G. Hossom, both of Duluth, Ga.

[73] Assignee: Murex Corporation, Norcross, Ga.

[21] Appl. No.: 884,713

[22] Filed: Jul. 11, 1986

[51] Int. Cl.$^4$ ............................................. H04M 11/00
[52] U.S. Cl. ...................................... 379/93; 379/106; 128/904
[58] Field of Search .................... 379/93, 96, 98, 106, 379/38; 128/904

[56] References Cited

U.S. PATENT DOCUMENTS

| | | | |
|---|---|---|---|
| 3,872,251 | 3/1975 | Aurbach et al. | 379/106 |
| 3,882,277 | 5/1975 | DePedro et al. | 379/106 |
| 3,886,314 | 5/1975 | Pori | 379/106 |
| 3,922,492 | 11/1975 | Lumsden | 379/98 |
| 3,987,246 | 10/1976 | Willis | 379/106 |
| 4,068,097 | 1/1978 | Verriest | 379/106 X |
| 4,104,486 | 8/1978 | Martin et al. | 379/106 |
| 4,173,971 | 11/1979 | Karz | 128/904 X |
| 4,243,322 | 1/1981 | Ingalz | 356/244 |
| 4,337,377 | 6/1982 | Van Riper et al. | 379/106 |
| 4,428,381 | 1/1984 | Hepp | 128/904 |

OTHER PUBLICATIONS

Bracale et al., "Multichannel Telephone System for Biomedical Applications", Med. & Biol. Eng., vol. 10, No. 5, pp. 688–691, 1972.
American Dade Division American Hospital Supply Corp., "Stratus TM Immunoassay System" Brochure.
Hybritech, "Pocket Guide 1986, TAndem E Systems", 1986.

Primary Examiner—Keith E. George
Attorney, Agent, or Firm—Sigalos, Levine & Montgomery

[57] ABSTRACT

The present invention relates to an interactive medical laboratory specimen testing apparatus system wherein a diagnostic apparatus is used in performing a diagnostic routine on a specimen. The apparatus has a single user activated switch for causing automatic dialing of a source of assistance remote from the diagnostic apparatus through a predetermined telephone number when the switch is activated to enable the user to communicate with the source of assistance through a speaker and a microphone on the diagnostic apparatus so that interactive communication with the source of assistance can be had regarding the diagnostic apparatus and the routine to be perfomed. A keyboard on the apparatus allows certain data regarding the performance of a test and operation of the apparatus to be transmitted to a remote location for analysis.

6 Claims, 1 Drawing Sheet

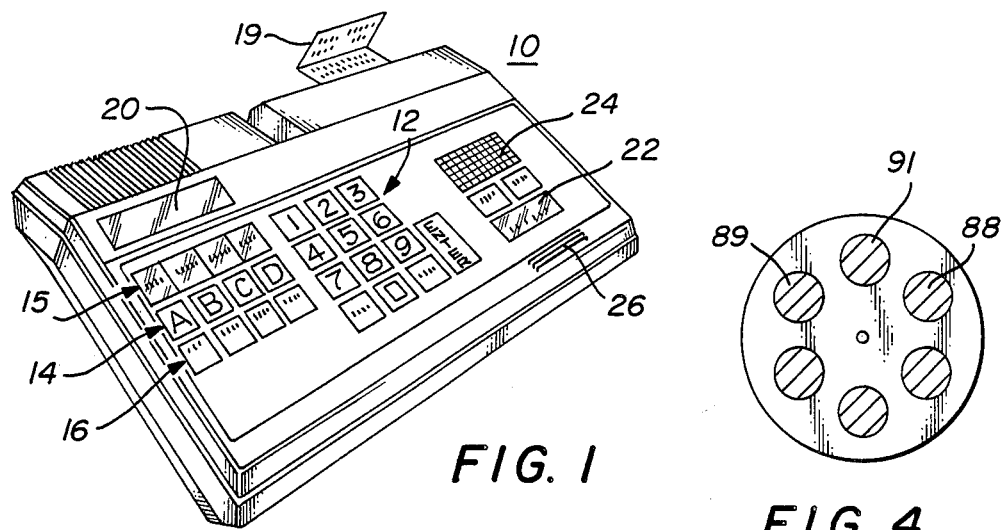
FIG. 1
FIG. 4
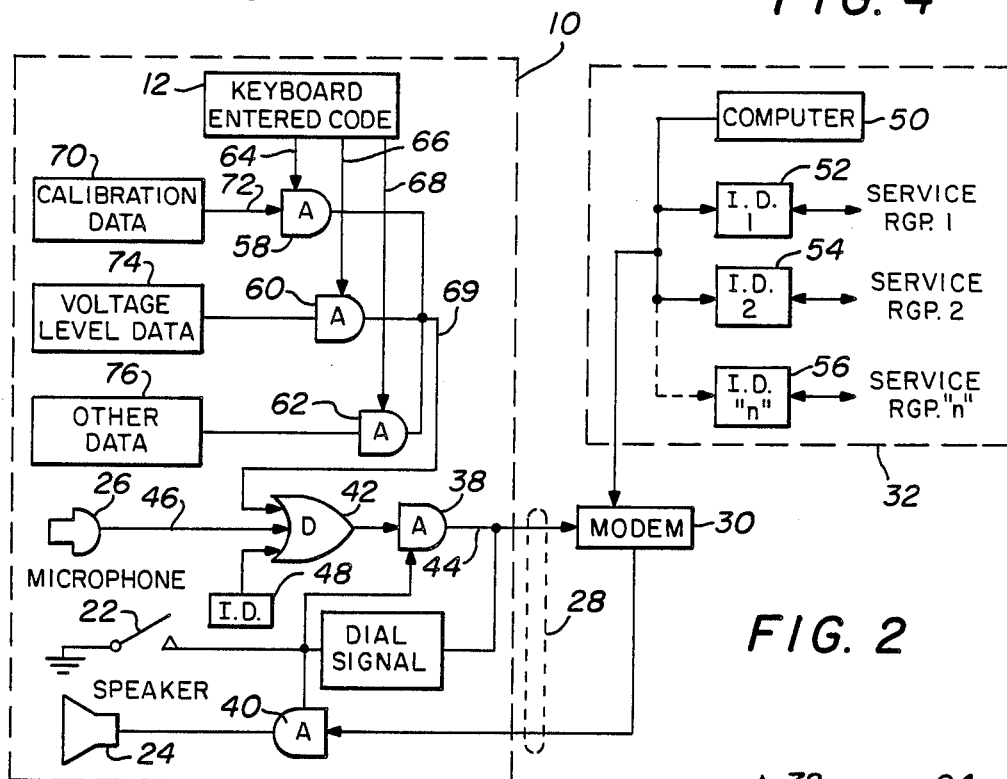
FIG. 2
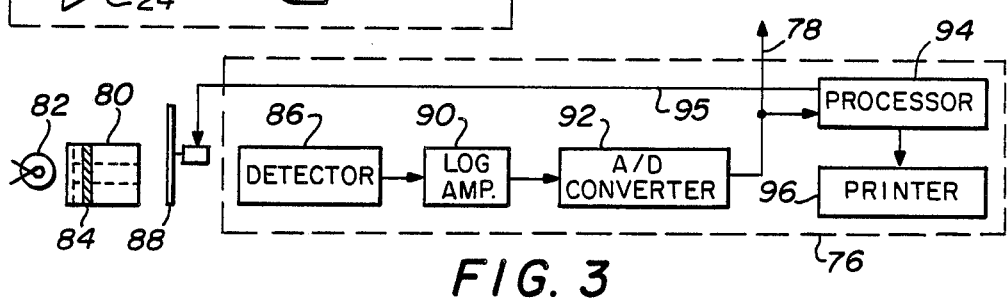
FIG. 3 ns to be

INTERACTIVE MEDICAL LABORATORY SPECIMEN APPARATUS SYSTEM

BACKGROUND OF THE INVENTION

The present invention relates to an interactive medical laboratory specimen testing apparatus system wherein a diagnostic apparatus is used in performing a diagnostic routine on a specimen. The apparatus has a single user activated switch for causing automatic dialing of a source of assistance remote from the diagnostic apparatus through a predetermined telephone number when the switch is activated to enable the user to communicate with the source of assistance through a speaker and a microphone on the diagnostic apparatus so that interactive communication with the source of assistance can be had regarding the diagnostic apparatus and the routine to be performed. A keyboard on the apparatus allows certain data regarding the performance of a test and operation of the apparatus to be transmitted to a remote location for analysis.

In commonly assigned co-pending application Ser. No. 740,100 filed May 31, 1985 and entitled TRANSVERSE FLOW DIAGNOSTIC DEVICE, applicant disclosed a diagnostic device for analyte assay which permits top, bottom and straight through reading of the filter means to determine the results of the test. In the device, the fluids and reactants necessary to carry out the tests are caused to flow outwardly through the filter means from a reaction zone at the point of application of the fluid to a localized portion of the top surface of the filter to peripheral portions in the filter so that no fluid passes completely through the filter at the point of application. The result of the reaction of the materials on the filter can then be viewed from either the top, or the bottom or with a read through device so that the user can be apprised of the results. In the prior art, diagnostic apparatus exists which pass a light through or reflect the light from the filter in order to obtain a reading representing the results of the reaction.

The diagnostic apparatus is normally designed with predetermined calibration data so as to generate the proper operating parameters for a particular test, to adjust the intensity of a light beam for a particular test, or to adjust a particular voltage level or provide other data. Once the apparatus has been properly calibrated and adjusted, the device containing the reaction products is placed in the diagnostic apparatus where a light is passed through or reflected from the filter and the apparatus automatically provides the results of the test. Some of the problems of the prior art occur during the time the apparatus is being calibrated or adjusted for a particular test while other problems may occur during the test itself. When such problems occur, the user of the diagnostic apparatus has to go to the nearest phone and call the maker of the apparatus at a remote location, typically a predetermined service instruction or assistance telephone number, where questions can be asked in order to attempt to solve the problems. After obtaining advice from the manufacturer, the user then goes back to the diagnostic apparatus and attempts to correct the problem based on the information received. If problems still occur, he must go back to the telephone and make additional calls as required. This procedure involves not only an inconvenience in attempting to find a phone at some distance removed from the diagnostic apparatus, but requires the user to discuss the problem without having the diagnostic apparatus in view unless the telephone happens to be placed at or near the diagnostic apparatus location.

The present invention overcomes the obstacles and problems of the prior art by placing a single user activated switch on the diagnostic apparatus which causes automatic dialing of a predetermined telephone number at a remote location to contact the manufacturer or source of assistance. A microphone and a speaker are also included on the diagnostic apparatus so that the user, once having activated the single switch, can communicate with the manufacturer or source of assistance at the predetermined telephone number and thereby communicate with the manufacturer while the user is actually utilizing the diagnostic apparatus to perform a test. In addition, each diagnostic apparatus has associated with it an identification code which is automatically transmitted to the manufacturer or source of assistance so that the particular diagnostic apparatus has a unique identification for use by a computer at the manufacturer or source of assistance. Further, the diagnostic apparatus has a keyboard thereon for the user to input data to calibrate the device or adjust the device for a particular operation or test. The manufacturer can then verbally instruct the user of the device to enter a particular code into the apparatus through the keyboard which will generate a data transmission to the manufacturer which can be analyzed by the manufacturer to determine whether or not the instrument is functioning properly. A variety of such data transmissions can be sent including calibration, voltage levels, and the like. Further, the identification number of the diagnostic apparatus can be utilized by the manufacturer to always provide an assistance request by the same customer representative so that continuity of service can be provided.

Thus it is an object of the present invention to provide a diagnostic apparatus which allows interactive communication from the apparatus itself to a source of assistance.

It is a further object of the present invention to provide a diagnostic apparatus for use in performing a diagnostic routine on a specimen which includes a single user activated switch on the diagnostic apparatus for causing automatic dialing of a source of assistance through a predetermined telephone number when the switch is activated.

It is still a further object of the present invention to include a microphone and a speaker on the diagnostic apparatus which are coupled by the single user activated switch to the source of assistance at the predetermined telephone number such that when the single switch is activated, interactive communications regarding the diagnostic apparatus and the routine to be performed with the apparatus is obtained with the source by means of the predetermined telephone number and the speaker and microphone.

It is still another object of the present invention to convert selected operating parameters of the diagnostic apparatus to data for transmission to the source of assistance when a control code is generated with the use of the keyboard on the diagnostic device thereby transmitting selected data concerning the diagnostic device to the source of assistance for analysis.

It is yet another object of the present invention to provide a multiplicity of customer representative terminals at the source of assistance with data from a diagnostic apparatus with a predetermined identification to be coupled always to a predetermined customer representative terminal whereby the user of the apparatus is coupled to the same customer representative terminal at the source of assistance whenever the user activates the single switch.

It is finally another object of the present invention to utilize electronic data storage means having a corresponding data storage memory area for each identified user so that received data representing operating parameters of a particular diagnostic apparatus are stored in a corresponding data storage area in memory whereby a permanent record of the received operating parameter data for each user is maintained in the memory.

SUMMARY OF THE PRESENT INVENTION

Thus the present invention relates to an interactive medical laboratory specimen test apparatus and system for communicating with a source of assistance remote from the test apparatus comprising diagnostic apparatus for use in performing a diagnostic routine on a specimen, a user activated switch on said diagnostic apparatus for causing automatic dialing of the source of assistance through a predetermined telephone number when the switch is activated, and a microphone and a speaker on the diagnostic apparatus coupled by the switch to on the source of assistance at the predetermined number when the switch is activated such that interactive communication with the source of assistance regarding the diagnostic apparatus and the routine to be performed with the apparatus is obtained by means of the predetermined number and the speaker and microphone.

The invention also relates to a method of interactive communication between a user operated diagnostic apparatus and a source of assistance comprising the steps of using diagnostic apparatus for performing a diagnostic routine on a specimen, coupling a switch on the apparatus to a telephone circuit for automatically dialing the source of assistance through a predetermined telephone number when the switch is activated, and coupling a microphone and a speaker on the apparatus to the switch such that when the switch is activated, interactive communication with the source of assistance regarding the diagnostic apparatus and the routine is obtained by means of the predetermined telephone number and the speaker and microphone.

BRIEF DESCRIPTION OF THE DRAWINGS

FIG. 1 is a pictorial representation of the diagnostic apparatus for use in performing a diagnostic routine on a specimen and illustrating the speaker and microphone and the single user activated switch or causing automatic dialing of a source of assistance through a predetermined telephone number;

FIG. 2 is a diagramatic illustration of the circuitry used in the present invention to enable interactive communication of assistance regarding the diagnostic apparatus and the routine to be performed;

FIG. 3 is a diagramatic representation of the circuitry for the test analyzer of the diagnostic apparatus; and FIG. 4 illustrates a filter having a plurality of interference filters therein for control by and use of the diagnostic device.

DETAILED DESCRIPTION OF THE DRAWINGS

FIG. 1 is a pictorial illustration of a diagnostic apparatus for use in performing a diagnostic routine on a specimen in a medical laboratory. The apparatus 10 has a numerical keyboard 12 as well as special entry keys in rows 14 and 16. "Enter" key 13 may be used to enter the data selected from keyboard 12 or the keys in rows 14 and 16. A slot 18 exists into which a diagnostic test device (not shown) can be inserted for reading. The test device has a filter therein which has a reaction zone for receiving a liquid so that a conventional analyte assay can be performed. The test device may be of the type disclosed in commonly assigned co-pending application Ser. No. 740,100 which is incorporated herein by reference. The test device can be analyzed by passing a light through the filter in a well known manner. The light source 82 in apparatus 10 (shown in FIG. 3) passes the light through the filter in the test device which is positioned in slot 18 in a manner well known in the prior art and the instrument 10 displays the result of the test on a screen 20 as is well known in the art.

Prior to using the apparatus to analyze the result of the test in accordance with the reaction that takes place on the filter of the test device in slot 18, the apparatus 10 must be calibrated. The calibration is also accomplished in a well known manner using keyboard 2 and special entry keys in rows 14 and 16. Should the user have any problems with the attempted calibration of the instrument or apparatus 10 or the results displayed from the test on display 20, he can simply depress a button 22 which closes a switch to cause automatic dialing of an 800 number at the offices of the manufacturer of the equipment 10 or at any other remote location. Through the use of speaker 24 and microphone 26, the user, while standing at the apparatus 10, can discuss the problem with an expert at the manufacturer or other remote source who can then assist in determining how to overcome the problem. In addition, the individual at the manufacturer or other remote source can request that the user enter certain information through keyboard 12 which establishes a code that causes apparatus 10 to transmit over the telephone certain data representing selected operating parameters of the diagnostic apparatus 10. For instance if the user is having difficulty with instrument calibration, the representative of the manufacturer could ask the user to press a particular combination of keys on keyboard 12 which would cause the unit 10 to transmit a batch of data which the representative at the remote location could anaylze and, based upon the analysis, give instructions to the user over speaker 24 on how to correct the problem. Other information could be transmitted to the representative of the manufacturer such as voltage levels at discrete points in the circuitry of apparatus 10 and the like.

FIG. 2 is a diagramatic representation of a circuit which could be utilized in the inventive system to enable the user to work with the diagnostic apparatus 10 while communicating with a source of information at a remote location. As can be seen in FIG. 2, apparatus 10 produces output signals and receives input signals on telephone cable 28 which is coupled to a modem 30 for transmission to and reception from a remote location 32. Remote location 32 could be at the manufacturers plant or at some other remote location as desired. Diagnostic apparatus 10 includes the single user activated switch 22 which, when closed or actuated, causes dialing unit 34 to produce a signal on line 36 to cause modem 30 to dial the proper 800 number. In addition, the signal from switch 22 activates gate 38 and gate 40. These gates may be AND gates enabled with bi-stable flip-flops in a well known manner. The object is to enable a transmission path through gates 38 and 40 when switch 22 is activated. Gate 40 couples the telephone lines to the speaker 24 so that any oral communications from remote station 32 can be heard by the user at diagnostic apparatus 10. In addition, gate 38 couples the output of OR gate 42 to modem 30 on line 44. OR gate 42 has as one input thereto the output of microphone 26 on line 46. Thus once switch 22 has been activated, the telephone number is dialed to couple apparatus 10 to the remote station 32 and the user can speak through microphone 26, and listen through speaker 24 to communicate with an individual at remote location 32.

In addition, an identification unit 48 generates an identification code which passes through OR gate 42, gate 38 and line 44 to the modem 30 to be transmitted to remote location 32. A computer 50 at remote location 32 can therefore keep track of all the communications from a particular diagnostic apparatus 10 by virtue of its identification number generated at 48 thus keeping a permanent record of communications with a particular diagnostic apparatus 10. In addition, a plurality of n comparators 52, 54 and 56 at the remote location 32 all look at the identification signal and the one that matches the identification code being transmitted from unit 48 couples those communications to a particular service representative. For instance if the identification code generated by unit 48 in diagnostic apparatus 10 is selected as identification number 1 at comparator 52 in remote location 32, service representative 1 will be communicating with the user of diagnostic unit 10. This assures the user that he is continually dealing with the same person at the remote location who understands whatever problems he may be having.

Should the service representative at the remote location 32 decide that it is important to check the electrical operation of the apparatus 10, he may ask the user (through speaker 24) to enter a particular code through keyboard 12 which would enable a selected AND gate 58, 60 or 62 on one of lines 64, 66 and 68. Assume that the code entered through the keyboard 12 produces a signal on line 64 which activates AND gate 58. Signals representing the calibration data are reduced to data for transmission by unit 70 (such as digital form) in a well known manner and unit 70 produces the data on line 72 and that data is coupled through AND gate 58, through OR gate 42, and gate 38 on line 44 to modem 30 for transmission to comparator station 52 at the remote location 32. This enables the service representative to analyze the signals at the remote location to determine that the signals are correct or to enable instructions to be given to the user at the location of diagnostic apparatus 10 for adjusting those signals. In like manner, voltage levels can be converted to additional data at unit 74 or other similar data at unit 76 and that information transmitted as requested to the remote location.

FIG. 3 is a block diagram of the circuitry for the test analyzer of the device 10. It is an automatic reading device which determines the optical density of an aqueous solution present in a membrane as a saturation. The reader works best with a wet filter membrane rather than dry. A diagnostic device such as that disclosed in commonly assigned U. S. patent application Ser. No. 740,100 is placed in the slot 18 (shown in FIG. 1) in such a manner that light from a source 82 passes through the bottom of the diagnostic device 80 and through filter 84 in the device 80, the optical density of which is to be determined. The flter or membrane 84 is saturated with an aqueous solution and the light passing through the filter is detected by detector 86. An interference filter wheel 88 is placed between the diagnostic device 80 and the detector 86. Filter wheel 88 has a plurality of filters each with a different interference frequency. A processor unit 94 through line 95 rotates the wheel about axis 93 until a first test filter 89 (FIG. 4) is positioned between diagnostic device 80 and detector 86. A first measurement of the amount of light is taken and the output of detector 86 is amplified by logarithmic amplifier 90 the output of which is coupled to analogue/digital converter 92 for conversion into digital form. The output of the analogue/digital converter 92 is coupled to line 78 which, as shown in FIG. 2, may be transmitted to a remote location through telephone lines and is also coupled to processor 94 which drives a printer 96 to print out the results of the first measurement.

After the first measurement has been taken, processor 94, under the control of a program, rotates filter wheel 88 until an interference filter 91 (FIG. 4) representing a standard wave length is placed between diagnostic device 80 and the detector 86 and a second reading taken. The optical density of the membrane or filter 84 is the difference between the absorbence of the test filter 89 wave length and the absorbence of standard filter 91 wave length. Light source 82 is a tungsten lamp with the diagnostic device 80 serving as an aperture coupling the light to the filters in wheel 88. Straight-through reading of the diagnostic device 80 is a notable aspect of the apparatus. Printer 96 could either be a visual printout 19 or an LCD display 20 as desired.

As explained previously, by entering certain codes through keyboard 12, AND gate 62 can be activated as shown in FIG. 2 to allow the data on line 78 to be transmitted to the manufacturer or remote location for analysis.

Further, if desired, the I. D. information 48 in FIG. 2 could be manually entered through keyboard 12 for transmission to the remote location so that the user can be identified and the code changed from time to time.

The switches in row 14 (FIG. 1) are designated as "soft" switches since they will generate a function that varies with the information displayed above the switch on LCD display 15. Display 15 is controlled by an EPROM (not shown) forming part of processor 94. Thus, as a particular test is progressing, the processor 94 will cause different instructions for a particular test to appear in the LCD 15 above the appropriate key in row 14. This feature enables the same key to be used for different functions and reduces the number of keys required on the diagnostic device 10. The second LCD display 20 is an information display which reports results such as "Test in Progress" and information such as "Insert Next Test". The keys in row 16 are designated "hard" keys and have fixed functions.

It can be seen that with such a system, many disadvantages of the prior art have been alleviated. First, the user has direct contact with a selected representative of the manufacturer or seller at a remote location. Secondly, the user at the diagnostic apparatus location can verbally communicate with the expert or representative of the seller or manufacturer at a remote location while he is actually attempting to perform the required tests. This means that the user will be able to obtain the assistance required while he is actually at the diagnostic apparatus performing the desired tests. Thirdly, only one switch needs to be depressed in order to dial the appropriate telephone number to obtain the assistance required. Fourth, at the instructions of the service representative at the remote location, the user can enter data through a keyboard which causes the device to actually transmit data representing certain operating parameters to the remote location for analysis where the expert can then orally communicate the findings to the user in order to assist the user in properly using and adjusting the equipment.

The embodiments described in the figures and the detailed description of the drawings are intended as examples rather than as limitations. Thus, the description of the invention is not intended to limit the invention to the particular embodiment disclosed but it is intended to encompass all equivalents and subject matter within the spirit and scope of the invention as described above and as claimed in the appended claims.

I claim:

1. An interactive medical laboratory specimen test system for communicating with a source of assistance remote from said test apparatus comprising:
   a. diagnostic apparatus for use in performing a diagnostic routine on a specimen, said apparatus generating signals representing both results of said diagnostic routine and selected operating parameters such as operating voltage levels and calibration data,
   b. a user activated switch on said diagnostic apparatus for causing automatic dialing of a predetermined telephone number to contact said source of assistance when said switch is activated,
   c. means for converting said generated signals to data for transmission to said source,
   d. keyboard means for generating a control code to select one of said generated signals,
   e. gate means coupled to said signal converting means and responsive to said control code for enabling transmission of said converted data representing a selected one of said signals to said source represented by said predetermined telephone number for analysis at said source,
   f. microphone on said diagnostic apparatus electrically coupled to said switch such that when said switch is activated verbal communication by said user to said source of assistance regarding said operating parameters of said diagnostic apparatus and said results of said routine is possible,
   g. means at said source for receiving and analyzing said converted signal data,
   h. a speaker on said apparatus activated by said switch, and
   i. means for transmitting the results of said analysis to said user verbally through said speaker when said switch is activated.

2. A system as in claim 1 further comprising:
   a. means in said apparatus for automatically generating and transmitting identification data representing said user to said source when said switch is activated,
   b. a multiplicity of customer representative terminals at said source, and
   c. means at said source for coupling said converted signal data from apparatus with a predetermined identification to a predetermined customer representative terminal at said source so that the user of said apparatus having a predetermined identification is always coupled to the same customer representative terminal at said source whenever said user activates said switch.

3. A system as in claim 2 further including a computer at said source comprising:
   a. means for recognizing said identification data representing said user,
   b. electronic data storage means having a corresponding data storage memory for each identified user, and
   c. means for coupling said received converted signal data to said corresponding data storage memory for storage thereof so that a permanent record of said received converted signal data is maintained in said memory for each user.

4. A method of interactive communication between a user operated diagnostic apparatus and a remote source of assistance comprising the steps of:
   a. performing a diagnostic routine on a specimen using said diagnostic apparatus,
   b. generating signals representing results of said diagnostic routine and selected operating parameters such as operating voltage levels and calibration data,
   c. actuating a switch on said apparatus for automatic dialing of a predetermined telephone number to contact said remote source of assistance when said switch is activated,
   d. converting said generated signals to data for transmission to said source,
   e. generating a control code with a keyboard to represent a selected one of each of said converted signals,
   f. transmitting data representing a selected one of said converted signals to said source represented by said automatically dialed predetermined telephone number when a particular control code is generated with said keyboard,
   g. coupling a microphone on said apparatus to said switch such that when said switch is activted verbal communication by said user to said source of assistance regarding said operating parameters of said diagnostic apparatus and said results of said routine is possible,
   h. receiving and analyzing said converted signal data at said source, and
   i. transmitting the results of said analysis to said user verbally through a speaker on said apparatus which is actuated by said switch.

5. A method as in claim 4 further comprising the steps of:
   a. automatically generating and transmitting identification data representing said user to said source when said switch is activated,
   b. providing a multiplicity of customer representative terminals at said source, and
   c. coupling said converted signal data from said apparatus with a predetermined user identification to a predetermined customer representative terminal at said source so that the user of said apparatus having a predetermined identification is always coupled to the same customer representative terminal at said source whenever said user activates said switch.

6. A method as in claim 5 further comprising the steps of:
   a. recognizing at said source said identification data representing said user,
   b. providing electronic data storage means having a corresponding data storage memory for each identified user, and
   c. coupling said received converted signal data to said corresponding data storage memory for storage thereof so that a permanent record of said received converted signal data is maintained in said memory for each user.

* * * * *